(12) United States Patent
Ljunggren

(10) Patent No.: US 9,458,397 B2
(45) Date of Patent: Oct. 4, 2016

(54) METHOD AND EQUIPMENT FOR PRODUCING SYNTHESIS GAS

(75) Inventor: Rolf Ljunggren, Sollentuna (SE)

(73) Assignee: CORTUS AB, Kista (SE)

( * ) Notice: Subject to any disclaimer, the term of this patent is extended or adjusted under 35 U.S.C. 154(b) by 927 days.

(21) Appl. No.: 12/996,792

(22) PCT Filed: Jun. 11, 2009

(86) PCT No.: PCT/SE2009/000297
§ 371 (c)(1),
(2), (4) Date: Jan. 20, 2011

(87) PCT Pub. No.: WO2009/151369
PCT Pub. Date: Dec. 17, 2009

(65) Prior Publication Data
US 2011/0099903 A1    May 5, 2011

(30) Foreign Application Priority Data

Jun. 11, 2008  (SE) ........................................ 0801364

(51) Int. Cl.
| | |
|---|---|
| *C10J 3/20* | (2006.01) |
| *C10J 3/10* | (2006.01) |
| *C10J 3/58* | (2006.01) |

(52) U.S. Cl.
CPC .. *C10J 3/20* (2013.01); *C10J 3/10* (2013.01); *C10J 3/58* (2013.01); *C10J 2300/093* (2013.01); *C10J 2300/094* (2013.01); *C10J 2300/0916* (2013.01); *C10J 2300/0946* (2013.01); *C10J 2300/0973* (2013.01); *C10J 2300/1223* (2013.01); *C10J 2300/1246* (2013.01); *C10J 2300/1261* (2013.01); *C10J 2300/1269* (2013.01); *C10J 2300/1861* (2013.01); *C10J 2300/1884* (2013.01); *Y02E 50/30* (2013.01); *Y02P 20/145* (2015.11)

(58) Field of Classification Search
CPC ................ C10J 3/00; C10J 2300/1207; C10J 2300/1269; C10J 3/80; C10J 3/86; C10J 2300/12; C10J 2300/1246
USPC .................................................. 48/61, 197 R
See application file for complete search history.

(56) References Cited

U.S. PATENT DOCUMENTS

| | | | |
|---|---|---|---|
| 4,497,637 A | 2/1985 | Purdy et al. | |
| 4,578,175 A * | 3/1986 | Gorin ............................ | 252/373 |
| 4,799,356 A | 1/1989 | Doering | |
| 4,919,686 A | 4/1990 | Edwards | |
| 5,637,192 A * | 6/1997 | Mansour et al. ............... | 162/29 |
| 6,767,375 B1 | 7/2004 | Pearson | |
| 6,960,234 B2 | 11/2005 | Hassett | |

FOREIGN PATENT DOCUMENTS

WO    2007/121268 A2    10/2007

OTHER PUBLICATIONS

International Search Report, dated Sep. 8, 2009, from corresponding PCT application.

* cited by examiner

*Primary Examiner* — Matthew Merkling
(74) *Attorney, Agent, or Firm* — Young & Thompson

(57) ABSTRACT

A method and equipment for producing synthesis gas (S) from solid carbon particles (C), the carbon particles (C) being obtained by pyrolysis, gasification of the carbon particles (C) occurs by indirect heating of the carbon particles (C) in the presence of a process gas (P) in the same space where the carbon particles (C) are present, and the synthesis gas (S) generated during the gasification is discharged from the space. The method is characterised in that the carbon particles (C) and the process gas (P) are located in a reactor (1), and the indirect heating occurs by way of radiant heat from burners (Br1-Brn) located in the reactor (1).

11 Claims, 1 Drawing Sheet

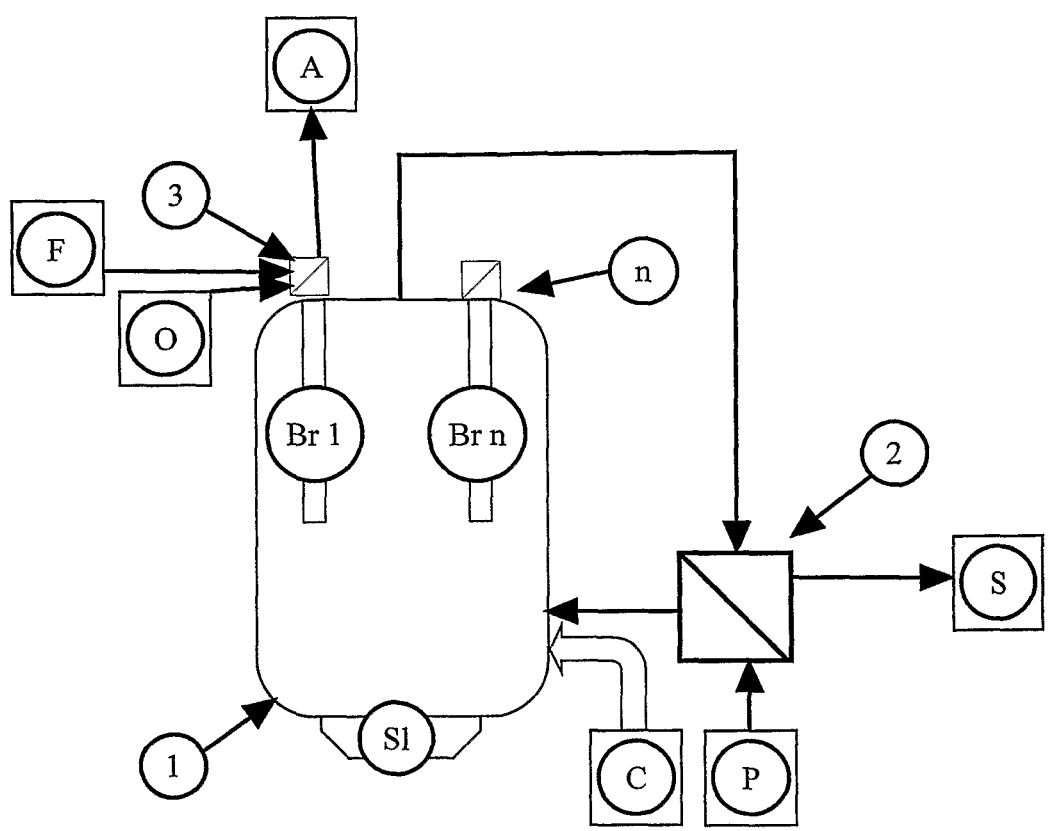

METHOD AND EQUIPMENT FOR PRODUCING SYNTHESIS GAS

TECHNICAL FIELD OF THE INVENTION

The present invention pertains to a method and an equipment for producing synthesis gas from solid carbon particles, said carbon particles being obtained by pyrolysis, gasification of the carbon particles occurs by indirect heating of the carbon particles in presence of a process gas in the same space where the carbon particles are present, and the synthesis gas generated during the gasification is discharged from said space.

PRIOR ART

Gasification is a process for producing gaseous fuel from solid fuel. The technique is used for coal, coal by-products, petroleum residues, wastes and biomass. The reactions are based on oxidising gases such as $CO_2$ and $H_2O$ being heated and reacting with carbon ([C] a reducing agent) whereupon carbon monoxide (CO) and hydrogen ($H_2$) are formed, heat being consumed to drive the reactions, which are endothermal. The mixture of carbon monoxide (CO) and hydrogen ($H_2$) is commonly called synthesis gas.

A customary gasification technique is to burn coal at significant understoichiometric conditions while supplying superheated steam. The combustion provides heat and combustion exhaust gases ($CO_2$ and $H_2$) to the system. Coal not burned but now superheated reacts with exhaust gases and supplied steam. The carbon (C) will reduce the carbon dioxide ($CO_2$) to carbon monoxide (CO) and the water steam ($H_2O$) to hydrogen ($H_2$). The heat consumed lowers the temperature and the reactivity diminishes. The reactivity of the carbon is highly temperature dependent, while the equilibrium of the reactions is temperature dependent. Today, oxygen-based combustion is the dominant form of combustion in a gasification context, even though air-based combustion does occur.

The problem with gasification of coal, coal by-products, petroleum residues, wastes and biomass is that they are not homogeneous material but components (tar) of different weight and complex components (aromatics) are released during the reaction. These components will not for certain react, but need to be removed before the synthesis gas can be used or further refined to liquid hydrocarbons or other fuel.

By pyrolysing coal, coal by-products, petroleum residues, wastes and biomass prior to the gasification reaction, these components (tar) of different weight and complex components (aromatics) can be driven off. The now obtained pyrolysis product consisting of condensable products and gases can be used as fuel in the gasification process. In the above described gasification with understoichiometric combustion, the pyrolysis reaction is part of the process. But the components (tar) of different weight and complex components (aromatics) are in the same reactor as the synthesis gas produced in the gasification process. Hence, the handling of components (tar) of different weight and complex components (aromatics) becomes a limiting factor on how effective the gasification process can become without physical problems such as condensation, deposits and the like arising in the reactor itself.

OBJECTS AND FEATURES OF THE INVENTION

A primary object of the present invention is to indicate a method and an equipment of the kind defined in the beginning, wherein an important principle of the present invention is the use of indirect heating.

A further object of the present invention is that the indirect heating uses fuel from a previous pyrolysis stage for carbon-containing material.

Yet another object of the present invention is to use heat exchange to utilise the heat content of products produced during the process.

BRIEF DESCRIPTION OF THE DRAWINGS

A preferred embodiment of the present invention will be described hereafter with reference to the enclosed drawing, where:

FIG. 1 shows a flow chart for a preferred method according to the present invention, said chart also showing schematically the units which form an equipment to carry out the method.

DETAILED DESCRIPTION OF A PREFERRED EMBODIMENT OF THE INVENTION

FIG. 1 shows schematically a number of units making up the equipment to carry out the method. The conduits, pipes, etc., which interconnect the units of the equipment are not described or shown in detail. The conduits, pipes, etc., are appropriately designed to fulfil their function, i.e., to transport gases and solids between units of the equipment.

FIG. 1 shows an indirectly heated gasification reactor 1 which is normally a ceramic-lined reactor. Solid carbon particles C are fed to the reactor along with the process gas P. The carbon particles C come from a pyrolysis preceding the gasification. The size of the carbon particles C is preferably sufficient to be borne along by incoming gas flow with process gas P into the reactor. The process gas P can be steam or recycled and purified exhaust A from the combustion stage. If the process gas P is recycled exhaust A, it may contain both water steam ($H_2O$) and carbon dioxide ($CO_2$). The process gas P is warmed by heat recovered from outgoing synthesis gas S in heat exchanger 2. The reaction occurring in the gasification reactor 1 is that carbon C reduces the content of the process gas P ($H_2O$ and $CO_2$) to synthesis gas S ($H_2$ and CO), which reduction uses the heat supplied to the process by burners Br 1 to Br n.

Gasification reactor 1 is heated indirectly by burners Br 1 to Br n (n being the number of burners needed for gasification reactor 1). Heat is furnished to the gasification reaction by radiation from Br 1 to Br n, the combustion occurring inside radiation tubes, i.e., separated from the gasification flow. No direct gas exchange occurs in the gasification reactor 1 between Br 1 to Br n and process gas P or its reaction products.

Burners Br 1 to Br n are supplied with fuel F preferably from a previous pyrolysis stage of the carbon-containing material. Oxidising agent O in the form of air, oxygen-enriched air or pure oxygen is supplied to the combustion. Heat exchanger 3 recovers heat from outgoing exhaust gases A and heats incoming oxidising agent O. Alternatively, the heat in heat exchanger 3 can be used to evaporate incoming water or for the preceding pyrolysis and drying process. The exhaust gases A go to the smoke gas cleaning, where requirements on emissions for the process are satisfied with cyclones, catalytic cleaning, filters (electrical or fabric) and scrubbers, depending on the requirements from incoming carbon-containing material.

The carbon C comes from a previous pyrolysis stage and contains ash residue. By controlling the temperature in gasification reactor 1 to above the melting point of the ash, it can be removed preferably in liquid form as slag S1.

Outgoing synthesis gas S can be used as energy gas for combustion purposes or as a base for further refining into liquid fuel (Fischer Tropsch for typical automotive fuel, methanol production or the like).

The pressure in the gasification reactor 1 can be controlled from atmospheric pressure to very high pressure (>100 bar). The temperature in the gasification reactor 1 is controlled to attain the maximum yield of synthesis gas S. A typical value is in the interval of 900-1300° C.

The indirect heating of the process gas P and carbon C can also occur in a pipe system inside a reactor where the combustion occurs in such a reactor and the pipe system in this case becomes the gasification reactor 1 most similar to a boiler, but at different higher temperature.

The geometry of the gasification reactor 1 depends on the reaction time requirement in the gasification process, which in turn depends on the chosen temperature. The geometry can be rotationally symmetrical in pipe form, where a very compact gasification process can be achieved, or a more voluminous design resembling a boiler and then with no need for rotational symmetry. The size of the reactor can be designed from a small scale to a very large industrial scale.

The synthesis gas S (H2 and CO) from the gasification reactor 1 will contain up to 50% hydrogen and the rest carbon monoxide depending on the makeup of the incoming process gas P.

The thermal efficiency for an indirectly heated gasification reactor will be very high and including prior pyrolysis and additional drying one can reach as much as 80% thermal efficiency for the entire system.

The invention claimed is:

1. A method for producing synthesis gas, comprising:
   obtaining solid carbon particles and burner fuel by pyrolysis;
   providing the carbon particles from the pyrolysis in a reactor, together with a process gas;
   providing the fuel from the pyrolysis to burners having closed ends located in the reactor, at least one burner being provided with means for supplying fuel to an internal space of the burners, the means for supplying fuel are located on an outside of the reactor, a heat exchanger is located adjacent to the means for supplying fuel to the at least one burner for heating of oxidising agent supplied to the at least one burner;
   gasifying the carbon particles by indirect heating of the carbon particles and the process gas in the same space where the carbon particles are present, by means of radiant heat from the burners, wherein combustion inside the burners is separated from gasification flow such that no direct gas exchange occurs in the reactor between the burners and the process gas, the pyrolysis is preceeding the gasification in a separate stage, and a temperature inside the reactor is 900-1300° C.; and
   discharging the synthesis gas generated during the gasification from said space.

2. The method according to claim 1, wherein heat exchange is used to heat the process gas by the synthesis gas generated during the gasification, the heating taking place before the process gas participates in the gasification.

3. Equipment for carrying out a method for producing synthesis gas, comprising:
   a reactor having an internal space;
   a separate pyrolysis stage where carbon particles and burner fuel is produced;
   at least one burner having a closed end placed inside the reactor, at least one burner being provided with a device supplying fuel to an internal space of the burners, the device supplying fuel being located on an outside of the reactor;
   a heat exchanger located adjacent to the device supplying fuel to the at least one burner for heating of oxidising agent supplied to the at least one burner, and a temperature inside the reactor is 900-1300° C.;
   a device for supplying burner fuel from the pyrolysis stage to the at least one burner for combustion,
   devices for supplying carbon particles and process gas to the internal space of the reactor; and
   a device for discharging the resulting synthesis gas,
   wherein the equipment is configured so that combustion of the burner fuel inside the at least one burner is separated from gasification flow such that no direct gas exchange occurs in the reactor between at least one burner and the process gas.

4. The equipment according to claim 3, wherein a heat exchanger for heating of the process gas and cooling of the synthesis gas is located on an outside of the reactor.

5. The method according to claim 1, wherein a heat exchanger for heating of the process gas and cooling of the synthesis gas is located on an outside of the reactor.

6. The method according to claim 2, wherein a heat exchanger for heating of the process gas and cooling of the synthesis gas is located on the outside of the reactor.

7. The method according to claim 1, wherein the process gas contains at least one of steam or $CO_2$.

8. The method according to claim 1, wherein the synthesis gas contains CO and $H_2$.

9. The method according to claim 1, wherein a pressure inside the reactor is from atmospheric pressure to >100 bar.

10. The method according to claim 1, wherein the synthesis gas contains CO and up to 50% $H_2$.

11. A method for producing synthesis gas, comprising:
    obtaining solid carbon particles and burner fuel by pyrolysis;
    providing the carbon particles from the pyrolysis in a reactor, together with a process gas;
    providing the fuel from the pyrolysis to burners having closed ends located in the reactor, at least one burner being provided with means for supplying fuel to an internal space of the burners, the means for supplying fuel are located on an outside of the reactor, a heat exchanger is located adjacent to the means for supplying fuel to the at least one burner, and heat from the heat exchanger is used in said pyrolysis;
    gasifying the carbon particles by indirect heating of the carbon particles and the process gas in the same space where the carbon particles are present, by means of radiant heat from the burners, wherein combustion inside the burners is separated from gasification flow such that no direct gas exchange occurs in the reactor between the burners and the process gas, the pyrolysis is preceeding the gasification in a separate stage, and a temperature inside the reactor is 900-1300° C.; and
    discharging the synthesis gas generated during the gasification from said space.

* * * * *